(12) United States Patent
Kapoor et al.

(10) Patent No.: US 7,491,910 B2
(45) Date of Patent: Feb. 17, 2009

(54) HARDFACING ELECTRODE

(75) Inventors: Ashish Kapoor, Highland Heights, OH (US); Teresa Melfi, Kirtland, OH (US); Damian Kotecki, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 304 days.

(21) Appl. No.: 11/387,025

(22) Filed: Mar. 22, 2006

(65) Prior Publication Data

US 2006/0165552 A1 Jul. 27, 2006

Related U.S. Application Data

(63) Continuation-in-part of application No. 11/041,815, filed on Jan. 24, 2005.

(51) Int. Cl.
*B23K 35/04* (2006.01)
*B23K 35/22* (2006.01)
*B23K 35/34* (2006.01)

(52) U.S. Cl. .............. 219/146.23; 219/145.1; 219/145.22; 219/146.1; 219/146.32; 219/146.52

(58) Field of Classification Search .......... 420/12, 420/16, 17, 27, 28, 36–39, 43–63, 67, 69; 219/145.1, 145.22, 146.1, 146.23, 146.32, 219/146.52
See application file for complete search history.

(56) References Cited

U.S. PATENT DOCUMENTS 4,800,131 A * 1/1989 Marshall et al. ............. 428/558
5,120,931 A * 6/1992 Kotecki et al. .......... 219/146.22
5,519,186 A * 5/1996 Sakurai et al. .......... 219/146.23
6,331,688 B1 * 12/2001 Hallen et al. .............. 219/73.21
6,339,209 B1 * 1/2002 Kotecki .................. 219/146.23
6,835,913 B2 12/2004 Duncan et al.
7,270,719 B2 * 9/2007 Berglund ..................... 148/225
2004/0173592 A1 9/2004 Duncan
2006/0081579 A1* 4/2006 Kotecki .................. 219/145.22
2006/0144836 A1* 7/2006 Karogal et al. ............ 219/146.1
2006/0186103 A1* 8/2006 Rajan ..................... 219/145.22
2007/0181549 A1* 8/2007 Hartman et al. .............. 219/137

FOREIGN PATENT DOCUMENTS

EP 1647351 4/2006
JP 8224691 3/1996

OTHER PUBLICATIONS

Tribology International Erosive Wear Behaviour of Weld Hardfacing High Chromium Cast Irons: Effect of Erodent Particles—Feb. 2005 Retrieved from the Internet—www.sciencedirect.com.
H. Berns, A. Fischer: Microstructure of Fe—Cr—C hardfacing alloys with additions of Nb, Ti and B. Metallography, vol. 20, No. 4, Nov. 1987 pp. 401-429.
Fan et al.—Microstructure change caused by (Cr, Fe) 23C6 carbides in high chromium Fe—Cr—C hardfacing alloys. Surface and coatings technology, Elsevier, vol. 201, No. 3-4, Oct. 5, 2006.

* cited by examiner

*Primary Examiner*—Bruce F Bell
(74) *Attorney, Agent, or Firm*—Fay Sharpe LLP; Brian E. Turung

(57) ABSTRACT

An electrode to form a hardfacing alloy for use as a surfacing on metal that is subjected to high thermal and mechanical stresses. The electrode includes chromium, a metal sensitization inhibitor, and iron to form a hardfacing alloy.

21 Claims, No Drawings

HARDFACING ELECTRODE

This application is a continuation-in-part of U.S. patent application Ser. No. 11/041,815 filed on Jan. 24, 2005 entitled "Hardfacing Alloy", which is incorporated herein by reference.

The invention relates generally to the field of metal alloys and more particularly directed to an electrode for forming a metal alloy on a workpiece, and even more particularly directed to an electrode for forming a hardfacing metal alloy on the surface of a workpiece.

BACKGROUND OF THE INVENTION

"Hardfacing" is a technique which involves applying a layer of hard material to a substrate for the purpose of increasing the wear and corrosion resistance of the substrate. The use of this technique has increased significantly over the years as industry has come to recognize that substrates of softer, lower, cost material can be hardfaced to have the same wear and corrosion resistance characteristics as more expensive substrates of a harder material.

Hardfacing involves the deposition of a hard layer by welding or thermal spraying. Conventional weld hardfacing is accomplished by oxyfuel welding (OFW), gas tungsten arc welding (TIG), gas metal arc welding (GMAW), shielded metal arc welding (SMAW), submerged arc welding (SAW), and flux-cored arc welding (FCAW). Plasma transferred arc (PTA) hardfacing and laser beam hardfacing can also be used.

Most prior hardfacing materials that are harder than silicious earth materials are brittle and have a tendency to crack. These hardfacing materials are alloys which belong to a well-known group of "high Cr-irons" and their high abrasive resistance is derived from the presence in the microstructure of the Cr-carbides of the eutectic and/or hypereutectic type. In the as-welded condition, whatever the precautions taken, these hardfacing overlays always show a more or less dense network of cracks.

In view of the present state of hardfacing technology, it would be highly desirable and advantageous to provide an electrode to form a hardfacing alloy composition having a microstructure of high abrasive resistance capable of being weld deposited without cracks to withstand the conditions of use. Furthermore, it is desirable to provide an electrode to form a high chromium welding metal alloy system for use as a hardfacing surfacing on metal components that are subjected to high thermal and mechanical stresses.

SUMMARY OF THE INVENTION

The present invention pertains to electrodes that form an alloy on a workpiece, and more particularly to an electrode that forms a hardfacing alloy on the surface of a workpiece, and even more particularly to an electrode that forms a high chromium hardfacing metal alloy system on the surface of a workpiece. The hardfacing alloy that is formed by the electrode of the present invention is particularly useful as a metal surfacing on materials subjected to high thermal and mechanical stresses such as, but not limited to, steel mill caster rolls. One such hardfacing alloy composition is disclosed in U.S. patent application Ser. No. 11/041,815 filed Jan. 24, 2005, which is incorporated herein by reference. The high chromium hardfacing alloy generally includes a low ferrite content in the hardfacing alloy matrix. The low ferrite content reduces the tendency of "fire cracking" in the hardfacing alloy. "Fire cracking" limits the life of a metal component that is coated or surfaced. Typically the ferrite content of the hardfacing alloy is less than about 10%, and more typically less than about 5%, and even more typically less than about 3%, and still even more typically less than about 2%. The hardfacing alloy can be formed by various types of electrodes and/or various types of welding processes. For instance, the electrode of the present invention can be a self shielding electrode or can be a gas shielded electrode. When the electrode is a gas shielded electrode, the shielding gas is generally $CO_2$, Argon, or a $CO_2$-Argon mixture; however, other shielding gasses can be used. The electrode of the present invention can be a solid wire electrode, a flux coated electrode, a flux cored electrode, a metal filled electrode, etc. As such, the electrode of the present invention can be used in several different types of welding processes such as, but not limited to, neutral SAW flux with alloyed cored/solid electrode, alloyed SAW flux with alloyed cored/solid electrode, alloyed SAW flux with unalloyed cored/solid electrode, cored electrode with an alloyed/unalloyed sheath and alloyed/unalloyed fill. As can be appreciated, other types of electrodes and/or other types of welding processes can be used. The hardfacing alloy formed by the electrode of the present invention has a hardness in the range of about 25-64 RC (welded or tempered), and an ASTM G-65 wear rating in the range of about 1-3 g.

The hardfacing alloy formed by the electrode of the present invention has a unique combination of chromium; nitrogen; and niobium and/or vanadium. Generally, the hardfacing alloy formed from the electrode of the present invention includes at least about 7% chromium; at least about 0.02% nitrogen; and at least about 0.3% niobium and/or at least about 0.05% vanadium. The hardfacing alloy also generally includes a majority of iron.

In one non-limiting example, the hardfacing alloy formed by the electrode of the present invention includes, by weight percent:

| Cr | 8-20% |
|---|---|
| N | 0.03-0.3% |
| Nb | 0.4-2.5% |
| V | 0.08-0.5% |

In another non-limiting example, the hardfacing alloy formed by the electrode of the present invention includes, by weight percent:

| C | 0.05-0.3% |
|---|---|
| Cr | 10-18% |
| Mn | 0.5-5% |
| Mo | 0.2-4% |
| N | 0.05-0.25% |
| Nb | 0.5-2% |
| Ni | 1-9% |
| V | 0.1-0.4% |
| Fe | 60-88% |

In still another non-limiting example, the hardfacing alloy formed by the electrode of the present invention includes, by weight percent:

| Al | 0-0.05% |
|---|---|
| C | 0.1-0.2 |
| Co | 0-0.05% |
| Cr | 10-15% |

-continued

| | |
|---|---|
| Cu | 0-0.1% |
| Mn | 1-3% |
| Mo | 0.5-2% |
| N | 0.05-0.2% |
| Nb | 0.5-1.5% |
| Ni | 3-6% |
| P | 0-0.02% |
| S | 0-0.02% |
| Si | 0-1.5% |
| Ta | 0-0.02% |
| Ti | 0-0.01% |
| V | 0.1-0.3% |
| Fe | 65-85% |

The electrode that is used to form the hardfacing alloys set forth above is typically a cored electrode; however, it will be appreciated that the electrode could be a solid wire electrode, a solid wire electrode that includes a flux coating, a flux cored electrode that includes a flux coating and/or the like. The electrode of the present invention can be a gas shielded electrode, a self shielded electrode, a strip material (using strip cladding, etc.), a manual electrode, a subarc electrode having an active flux and the like. In one non-limiting embodiment of the present invention, the electrode is a cored electrode that includes a metal sheath and a fill composition. The metal sheath is generally formed primarily from an iron alloy (e.g., carbon steel, low carbon steel, stainless steel, low alloy steel, etc.). When the electrode is a cored electrode, the fill composition typically constitutes at least about 1 weight percent of the total electrode weight, and not more than about 60 weight percent of the total electrode weight, and typically about 10-55 weight percent of the total electrode weight, and more typically about 15-50 weight percent of the total electrode weight, and even more typically about 20-40 weight percent of the total electrode weight; however, it can be appreciated that other weight percentages can be used. The fill composition can include one or more slag forming agents used to facilitate in the formation of the hardfacing alloy and/or to at least partially shield the formed hardfacing from the atmosphere; however, this is not required. The fill composition typically includes one or more metal alloying agents selected to at least closely match the desired hardfacing composition and/or to obtain the desired properties of the formed hardfacing alloy.

In one non-limiting embodiment, the composition of the metal sheath or solid wire in weight percent is as follows:

| | |
|---|---|
| Aluminum | up to 1% |
| Carbon | up to 1.1% |
| Iron | 50-99.95% |
| Manganese | up to 5% |

In another one non-limiting embodiment, the composition of the metal sheath or solid wire in weight percent is as follows:

| | |
|---|---|
| Aluminum | 0-0.6% |
| Boron | 0-1% |
| Calcium | 0-0.01% |
| Carbon | 0-0.6% |
| Cobalt | 0-0.05% |
| Copper | 0-4% |
| Chromium | 0-25% |
| Iron | 60-99.9% |
| Manganese | 0-4% |
| Mercury | 0-10 ppm |
| Molybdenum | 0-7% |
| Niobium | 0-2.5% |
| Nickel | 0-26% |
| Nitrogen | 0-0.4% |
| Phosphorous | 0-0.06% |
| Selenium | 0-0.5% |
| Silicon | 0-3% |
| Sulfur | 0-0.1% |
| Tantalum | 0-0.02% |
| Tin | 0-0.1% |
| Titanium | 0-0.7% |
| Vanadium | 0-0.5% |
| Zinc | 0-0.1% |
| Zirconium | 0-0.3% |

In still another one non-limiting embodiment, the composition of the metal sheath or solid wire in weight percent is as follows:

| | |
|---|---|
| Aluminum | 0.01-0.1% |
| Boron | 0-0.05% |
| Calcium | 0-0.01% |
| Carbon | 0.01-0.45% |
| Cobalt | 0-0.05% |
| Copper | 0-0.2% |
| Chromium | 0-14% |
| Iron | 90-99.87% |
| Magnesium | 0-0.4% |
| Manganese | 0.05-1.9% |
| Mercury | 0-4 ppm |
| Molybdenum | 0-1% |
| Nickel | 0-5% |
| Niobium | 0-1% |
| Nitrogen | 0-0.1% |
| Phosphorous | 0-0.04% |
| Selenium | 0-0.2% |
| Silicon | 0-0.6% |
| Sulfur | 0-0.05% |
| Tantalum | 0-0.05% |
| Tin | 0-0.05% |
| Titanium | 0-0.1% |
| Vanadium | 0-0.25% |
| Zirconium | 0-0.2% |
| Zinc | 0-0.05% |

As can be appreciated, the metal sheath or solid wire can have other compositions.

In one non-limiting example of the electrode of the present invention wherein the electrode includes a metal sheath and a fill composition, the metal powder in the fill composition based on total weight percent of the electrode is as follows:

| | |
|---|---|
| Aluminum | 0-4% |
| Chromium | 0-25% |
| Magnesium | 0-2% |
| Manganese | 0-5% |
| Molybdenum | 0-5% |
| Niobium | 0-3% |
| Nickel | 0-20% |
| Silicon | 0-4% |
| Vanadium | 0-2% |

In another non-limiting example of the electrode of the present invention wherein the electrode includes a metal sheath and a fill composition, the metal powder in the fill composition on total weight percent of the electrode is as follows:

| | |
|---|---|
| Aluminum | 0-2% |
| Carbon | 0-1% |
| Cobalt | 0-0.5% |
| Copper | 0-2% |
| Chromium | 0-18% |
| Iron | 0-20% |
| Magnesium | 0-1% |
| Manganese | 0-4% |
| Molybdenum | 0-2% |
| Niobium | 0.05-2% |
| Nickel | 0-15% |
| Silicon | 0-2% |
| Tantalum | 0-0.08% |
| Vanadium | 0.05-0.8% |

In another non-limiting example of the electrode of the present invention wherein the electrode includes a metal sheath and a fill composition, the metal powder in the fill composition on total weight percent of the electrode is as follows:

| | |
|---|---|
| Aluminum | 0-1% |
| Carbon | 0-0.3% |
| Cobalt | 0-0.06% |
| Copper | 0-0.01% |
| Chromium | 1-15% |
| Iron | 0-8% |
| Magnesium | 0-0.4% |
| Manganese | 0-1.5% |
| Molybdenum | 0-1% |
| Niobium | 0.1-0.8% |
| Nickel | 0-8% |
| Silicon | 0-0.9% |
| Tantalum | 0-0.05% |
| Titanium | 0-0.08% |
| Vanadium | 0.05-0.3% |
| Zinc | 0-0.004% |

As can be appreciated, other fill compositions can be used.

The fill composition can include one or more flux and/or slag components; however, this is not required. The flux and/or slag components, when included in the fill composition, can include one or more metal oxides (e.g., aluminum oxide, boron oxide, calcium oxide, chromium oxide, iron oxide, magnesium oxide, niobium oxide, potassium oxide, silicon dioxide, sodium oxide, tin oxide, titanium oxide, vanadium oxide, zirconium oxide, etc.), metal carbonates (e.g., calcium carbonate, magnesium carbonate, etc.), and/or metal fluorides (e.g., barium fluoride, bismuth fluoride, calcium fluoride, potassium fluoride, sodium fluoride, Teflon, etc.), and/or other refractory silacious materials. These one or more flux and/or slag components can be used to improve arc stability, provide gas shielding, modify the slag characteristics, modify the composition of the hardfacing alloy, etc. When flux and/or slag components are included in the fill composition, these flux components generally constitute less than about 50 weight percent of the fill composition, typically less than about 30 weight percent of the fill composition, and even more typically about 2-15 weight percent of the fill composition; however, it can be appreciated that other weight percentages can be used.

It is an object of the present invention to provide an electrode used to form an alloy on a workpiece.

It is another and/or alternative object of the present invention to provide an electrode used to form a hardfacing alloy for use on material subjected to high thermal and mechanical stresses to thereby increase the life of such materials.

It is still another and/or alternative object of the present invention to provide an electrode used to form a hardfacing alloy that reduces the tendency of "fire cracking."

It is yet another and/or alternative object of the present invention to provide an electrode used to form a hardfacing alloy having a low ferrite content in the deposit.

It is still yet another and/or alternative object of the present invention to provide an electrode used to form a hardfacing alloy that reduces sensitization of the alloy during thermal cycling.

These and other objects and advantages will become apparent from the discussion of the distinction between the invention and the prior art.

DETAILED DESCRIPTION OF THE INVENTION

Referring to the following description of the invention for purposes of describing preferred embodiments of the invention only, and not for the purpose of limiting the invention, the electrode of the present invention is formulated to produce an alloy, such as a hardfacing alloy composition, on a metal surface. When the alloy is a hardfacing alloy, the hardfacing alloy has an average hardness of about 25-65 RC in the welded state and/or the tempered state. The formed hardfacing alloy is particularly formulated to form a high chromium welding metal alloy system for use as a surfacing on metals subjected to high thermal and mechanical stresses. One such application is to apply the hardfacing alloy to steel mill caster rolls; however, it will be appreciated that the hardfacing alloy can be used in other applications. The produced hardfacing alloy is also formulated to resist the tendency for "fire cracking", thereby extending the life of metal materials that are surfaced with the hardfacing alloy. The formed hardfacing alloy is also formulated so as to reduce the amount of ferrite in the alloy matrix. Typically, the hardfacing alloy includes less than about 6%, more typically, less than about 4% ferrite, even more particularly less than about 2% ferrite, and still even more particularly less than about 1% ferrite. The formed hardfacing alloy is further formulated to reduce sensitization of the alloy which can occur during thermal cycling.

The electrode of the present invention is designed and formulated so that the formed hardfacing alloy composition can be deposited by any suitable welding means and methods such as, but not limited to, open arc, gas or flux shielded. The electrode of the present invention can be a solid wire, cored electrode, coated electrode or coated cored electrode. When the electrode is a coated and/or cored electrode, the coating and/or fill material in the core can include alloying agents, fluxing agents, slag agents, gas generating agents, etc. The electrode can be a self shielding electrode and/or be used in the presence of a shielding gas. The formed hardfacing alloy can be applied by directly depositing the metal particles on the workpiece and/or can be spray coated on the workpiece. As such, the formed hardfacing alloy can be applied by a variety of processes such as, but not limited to, submerged arc welding (SAW), shielded metal arc welding (SMAW), flux-cored arc welding (FCAW), gas metal arc welding (GMAW), gas tungsten arc welding (TIG), metal spraying, etc.

The chemical analysis of one non-limiting hardfacing alloy by weight percent which can be formed by the electrode of the present invention is set forth as follows:

| | |
|---|---|
| C | 0.1-0.2% |
| Cr | 10-15% |
| Mn | 1-3% |
| Mo | 0.5-2% |
| N | 0.05-0.2% |
| Nb | 0.5-1.5% |
| Ni | 3-6% |
| V | 0.1-0.3% |
| Fe | 65-85% |

The believed functions of each of these components of the hardfacing alloy will be described; however, it will be appreciated that these are only the believed functions of the components, thus the components could have other or additional functions in the hardfacing alloy. The carbon in the hardfacing alloy is believed to influence the hardness level of the hardfacing alloy and to also influence the ferrite content of the hardfacing alloy. Generally the carbon content of the hardfacing alloy is at least about 0.04 weight percent of the hardfacing alloy and less than about 0.35 weight percent. The chromium in the hardfacing alloy is believed to affect the corrosion resistance of the hardfacing alloy and to also influence the ferrite content of the hardfacing alloy. Generally the chromium content of the hardfacing alloy is at least about 7 weight percent of the hardfacing alloy and less than about 25 weight percent. The manganese in the hardfacing alloy is believed to function as a deoxidizer and to also reduce or prevent hot cracking of the hardfacing alloy. Generally the manganese content of the hardfacing alloy is at least about 0.4 weight percent of the hardfacing alloy and less than about 6 weight percent. The molybdenum in the hardfacing alloy is believed to affect the corrosion resistance of the hardfacing alloy and to also affect the ferrite content of the hardfacing alloy. Generally, the molybdenum content of the hardfacing alloy is at least about 0.15 weight percent of the hardfacing alloy and less than about 4.5 weight percent. The nitrogen in the hardfacing alloy is believed to reduce or prevent sensitization of the hardfacing alloy. Generally, the nitrogen content of the hardfacing alloy is at least about 0.02 weight percent of the hardfacing alloy and less than about 0.35 weight percent. The niobium in the hardfacing alloy is believed to increase the resistance of the hardfacing alloy to tempering and to also inhibit or prevent sensitization of the hardfacing alloy. Niobium can be referred to as a metal sensitization inhibitor. Generally the niobium content of the hardfacing alloy is at least about 0.3 weight percent of the hardfacing alloy and less than about 3 weight percent. The nickel in the hardfacing alloy is believed to affect the corrosion resistance of the hardfacing alloy; affect the strength, toughness and ductility of the hardfacing alloy; and to also affect the ferrite content of the hardfacing alloy. Generally the nickel content of the hardfacing alloy is at least about 0.5 weight percent of the hardfacing alloy and less than about 10 weight percent. The vanadium in the hardfacing alloy is believed to increase the resistance of the hardfacing alloy to tempering and to also inhibit or prevent sensitization of the hardfacing alloy. Vanadium can be referred to as a metal sensitization inhibitor. Generally the vanadium content of the hardfacing alloy is at least about 0.05 weight percent of the hardfacing alloy and less than about 0.6 weight percent. The hardfacing alloy can include one or more other components such as, but not limited to, aluminum, silicon and/or titanium. The aluminum, when included in the hardfacing alloy, is believed to affect the ferrite content in the hardfacing alloy. Generally the aluminum content of the hardfacing alloy is less than about 0.2 weight percent. The silicon, when included in the hardfacing alloy, is believed to function as a deoxidizer for the hardfacing alloy. Generally the silicon content of the hardfacing alloy is less than about 2 weight percent. The titanium, when included in the hardfacing alloy, is believed to affect the ferrite content in the hardfacing alloy. Generally the titanium content of the hardfacing alloy is less than about 0.1 weight percent.

The chemical analysis of one non-limiting example of the hardfacing alloy by weight percent which can be formed by the electrode of the present invention is set forth below:

| | |
|---|---|
| Al | 0-0.05% |
| C | 0.1-0.15% |
| Co | 0-0.05% |
| Cr | 10.5-13.5% |
| Cu | 0-0.1% |
| Mn | 1-1.8% |
| Mo | 0.6-1.4% |
| N | 0.06-0.12% |
| Nb | 0.5-1% |
| Ni | 3.5-5% |
| P | 0-0.02% |
| S | 0-0.02% |
| Si | 0.5-1.5% |
| Ta | 0-0.02% |
| Ti | 0-0.01% |
| V | 0.12-0.25% |
| Fe | 74-84% |

One non-limiting embodiment of an electrode that can form the hardfacing alloy as set forth above is a electrode formed of a mild steel sheath and includes a fill composition. As can be appreciated, other types of metal sheaths can be used. One non-limiting composition of the mild metal sheath of the electrode in weight percent of the metal sheath is as follows:

| | |
|---|---|
| Aluminum | 0.02-0.08% |
| Calcium | 0-0.003% |
| Carbon | 0.02-0.09% |
| Copper | 0-0.08% |
| Chromium | 0-0.1% |
| Iron | 98-99.87% |
| Manganese | 0.07-0.3% |
| Mercury | 0-4 ppm |
| Molybdenum | 0-0.04% |
| Nickel | 0-0.1% |
| Nitrogen | 0-0.01% |
| Phosphorous | 0-0.02% |
| Silicon | 0-0.1% |
| Sulfur | 0-0.03% |
| Tin | 0-0.03% |
| Vanadium | 0-0.03% |

The fill composition in the electrode typically constitutes about 25-35 weight percent of the electrode. The fill composition includes a majority weight percent metal powder. Up to about 10 weight percent of the fill composition can include non-metal powder components. These non-metal powder components can include metal oxides (e.g., aluminum oxide, magnesium oxide, silicon dioxide, sodium oxide, etc.), carbonates (e.g., calcium carbonate, magnesium carbonate, etc.), metal fluorides (e.g., calcium fluoride, etc.) and other elements and compounds (e.g., nitrogen, phosphorous, sulfur, etc.). These non-metal powder components can be used as filler materials in the fill composition, and/or be used to improve arc stability, provide gas shielding, modify the slag characteristics, modify the composition of the hardfacing alloy, etc.

One non-limiting example of a fill composition by weight percent total electrode that can be used in the electrode of the present invention is as follows:

| | |
|---|---|
| Aluminum | 0.1-0.5% |
| Carbon | 0.02-0.25% |
| Calcium | 0-0.002% |
| Cobalt | 0-0.03% |
| Chromium | 10-15% |
| Copper | 0-0.005% |
| Iron | 3-7% |
| Magnesium | 0.05-0.3% |
| Manganese | 0.5-1.5% |
| Molybdenum | 0.4-1% |
| Niobium | 0.4-0.7% |
| Nickel | 3-7% |
| Silicon | 0.2-0.7% |
| Tantalum | 0-0.03% |
| Titanium | 0-0.05% |
| Vanadium | 0.1-0.3% |
| Zinc | 0-0.003% |

These and other modifications of the discussed embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

We claim:

1. An electrode for forming a hardfacing alloy for application to a metal surface, said electrode including iron, at least 0.05 weight percent by electrode vanadium and over 0.1 weight percent by electrode niobium, said hardfacing alloy comprising of at least about 7 weight percent chromium, at least about 0.02 weight percent nitrogen, metal sensitization inhibitor, and a majority weight percent iron, said hardfacing alloy containing less than about 6% ferrite, said metal sensitization inhibitor in said hardfacing alloy including a metal selected from the group consisting of at least about 0.3% niobium, at least about 0.05% vanadium, and combinations thereof, said electrode including a metal sheath and a fill composition said fill composition comprising by weight percent of said total electrode:

| | |
|---|---|
| Aluminum | up to 1% |
| Carbon | up to 0.3% |
| Cobalt | 0-0.06% |
| Copper | 0-0.01% |
| Chromium | 1-15% |
| Iron | up to 8% |
| Magnesium | 0-0.4% |
| Manganese | up to 1.5% |
| Molybdenum | 0-1% |
| Niobium | up to 0.8% |
| Nickel | 0-8% |
| Silicon | 0-0.9% |
| Tantalum | 0-0.05% |
| Titanium | 0-0.08% |
| Vanadium | 0.05-0.3% |
| Zinc | 0-0.004%. |

2. The electrode as defined in claim 1, wherein said fill composition constituting about 10-60 weight percent of said electrode.

3. The electrode as defined in claim 2, wherein said fill composition includes a majority weight percent metal powder.

4. The electrode as defined in claim 3, wherein said metal sheath comprising by weight percent of said metal sheath:

| | |
|---|---|
| Aluminum | up to 1% |
| Carbon | up to 1.1% |
| Iron | 50-99.95% |
| Manganese | up to 5%. |

5. The electrode as defined in claim 4, wherein said metal sheath comprising by weight percent of said metal sheath:

| | |
|---|---|
| Aluminum | up to 0.6% |
| Calcium | 0-0.01% |
| Carbon | up to 0.6% |
| Copper | 0-4% |
| Chromium | 0-25% |
| Iron | 60-99.9% |
| Manganese | up to 4% |
| Mercury | 0-10 ppm |
| Molybdenum | 0-7% |
| Niobium | up to 2.5% |
| Nickel | 0-26% |
| Nitrogen | up to 0.4% |
| Phosphorous | 0-0.06% |
| Silicon | 0-3% |
| Tin | 0-0.1% |
| Vanadium | up to 0.5%. |

6. The electrode as defined in claim 2, wherein said metal sheath comprising by weight percent of said metal sheath:

| | |
|---|---|
| Aluminum | up to 1% |
| Carbon | up to 1.1% |
| Iron | 50-99.95% |
| Manganese | up to 5%. |

7. The electrode as defined in claim 6, wherein said metal sheath comprising by weight percent of said metal sheath:

| | |
|---|---|
| Aluminum | up to 0.6% |
| Calcium | 0-0.01% |
| Carbon | up to 0.6% |
| Copper | 0-4% |
| Chromium | 0-25% |
| Iron | 60-99.9% |
| Manganese | up to 4% |
| Mercury | 0-10 ppm |
| Molybdenum | 0-7% |
| Niobium | 0-2.5% |
| Nickel | 0-26% |
| Nitrogen | up to 0.4% |
| Phosphorous | 0-0.06% |
| Silicon | 0-3% |
| Tin | 0-0.1% |
| Vanadium | up to 0.5%. |

8. An electrode for forming an alloy on a metal surface, said electrode comprising by weight percent electrode:

| | |
|---|---|
| Carbon | 0.05-0.4% |
| Chromium | 5-20% |
| Iron | 75-93% |
| Niobium | 0.2-1% |
| Nickel | 1-10% |
| Vanadium | 0.04-0.4%. |

9. The electrode as defined in claim 8, wherein said electrode comprising by weight percent electrode:

| | |
|---|---|
| Aluminum | 0-0.6% |
| Calcium | 0-0.008% |
| Carbon | 0.1-0.4% |
| Cobalt | 0-0.05% |
| Chromium | 8-20% |
| Copper | 0-0.4% |
| Iron | 75-90% |
| Manganese | 0-1.5% |
| Mercury | 0-5 ppm |
| Molybdenum | 0-1.5% |
| Niobium | 0.25-0.9% |
| Nickel | 2-8% |
| Nitrogen | 0-0.2% |
| Phosphorous | 0-0.04% |
| Silicon | 0-1% |
| Sulfur | 0-0.05% |
| Tantalum | 0-0.03% |
| Tin | 0-0.1% |
| Titanium | 0-0.1% |
| Vanadium | 0.08-0.35% |
| Zinc | 0-0.01%. |

10. The electrode as defined in claim 9, wherein said electrode includes a metal sheath and a fill composition, said fill composition constituting about 10-60 weight percent of a total weight of said electrode.

11. The electrode as defined in claim 10, wherein said fill composition includes a majority weight percent metal powder based on a total weight percent of said fill composition.

12. The electrode as defined in claim 8, wherein said electrode includes a metal sheath and a fill composition, said fill composition constituting about 10-60 weight percent of a total weight of said electrode.

13. The electrode as defined in claim 12, wherein said fill composition includes a majority weight percent metal powder based on a total weight percent of said fill composition.

14. A method of applying a hardfacing alloy on a metal surface comprising:
   a) selecting a workpiece metal; and,
   b) applying a high chromium alloy metal at least partially on said workpiece by use of an electrode, said electrode comprising by weight percent electrode about 0.05-0.4% carbon, about 5-20% chromium, about 75-93% iron, about 0.2-1% niobium, about 1-10% nickel, and about 0.04-0.4% vanadium.

15. The method as defined in claim 14, wherein said alloy is a hardfacing alloy, said hardfacing alloy including at least about 7 weight percent chromium, at least about 0.02 weight percent nitrogen, metal sensitization inhibitor, and a majority weight percent iron, said hardfacing alloy containing less than about 6% ferrite, said metal sensitization inhibitor including a metal selected from the group consisting of at least about 0.3% niobium, at least about 0.05% vanadium, and combinations thereof.

16. The method as defined in claim 15, wherein said electrode comprising by weight percent electrode:

| | |
|---|---|
| Aluminum | 0-0.6% |
| Calcium | 0-0.008% |
| Carbon | 0.1-0.4% |
| Cobalt | 0-0.05% |
| Chromium | 8-20% |
| Copper | 0-0.4% |
| Iron | 75-90% |
| Manganese | 0-1.5% |
| Mercury | 0-5 ppm |
| Molybdenum | 0-1.5% |
| Niobium | 0.25-0.9% |
| Nickel | 2-8% |
| Nitrogen | 0-0.2% |
| Phosphorous | 0-0.04% |
| Silicon | 0-1% |
| Sulfur | 0-0.05% |
| Tantalum | 0-0.03% |
| Tin | 0-0.1% |
| Titanium | 0-0.1% |
| Vanadium | 0.08-0.35% |
| Zinc | 0-0.01%. |

17. The method as defined in claim 16, wherein said electrode includes a metal sheath and a fill composition, said fill composition constituting about 10-60 weight percent of said electrode.

18. The method as defined in claim 17, wherein said step of applying said alloy is by a process selected from the group consisting of submerged arc welding, shielded metal arc welding, flux-cored arc welding, gas metal arc welding, gas tungsten arc welding, electroslag cladding, or spray cladding.

19. The method as defined in claim 14, wherein said electrode comprising by weight percent electrode:

| | |
|---|---|
| Aluminum | 0-0.6% |
| Calcium | 0-0.008% |
| Carbon | 0.1-0.4% |
| Cobalt | 0-0.05% |
| Chromium | 8-20% |
| Copper | 0-0.4% |
| Iron | 75-90% |
| Manganese | 0-1.5% |
| Mercury | 0-5 ppm |
| Molybdenum | 0-1.5% |
| Niobium | 0.25-0.9% |
| Nickel | 2-8% |
| Nitrogen | 0-0.2% |
| Phosphorous | 0-0.04% |
| Silicon | 0-1% |
| Sulfur | 0-0.05% |
| Tantalum | 0-0.03% |
| Tin | 0-0.1% |
| Titanium | 0-0.1% |
| Vanadium | 0.08-0.35% |
| Zinc | 0-0.01%. |

20. The method as defined in claim 14, wherein said electrode includes a metal sheath and a fill composition, said fill composition constituting about 10-60 weight percent of said electrode.

21. The method as defined in claim 14, wherein said step of applying said alloy is by a process selected from the group consisting of submerged arc welding, shielded metal arc welding, flux-cored arc welding, gas metal arc welding, gas tungsten arc welding, electroslag cladding, or spray cladding.

* * * * *